Patented Apr. 5, 1949

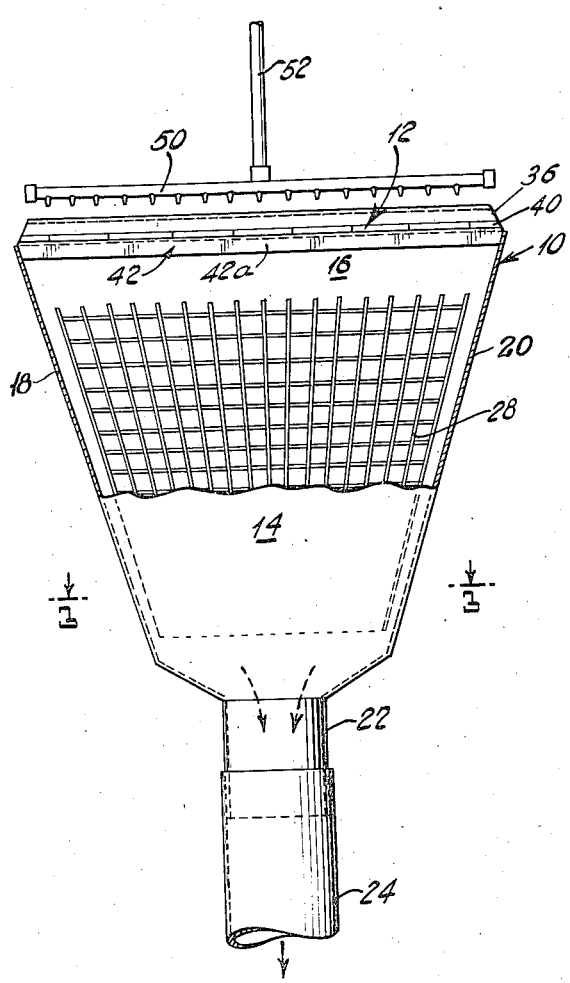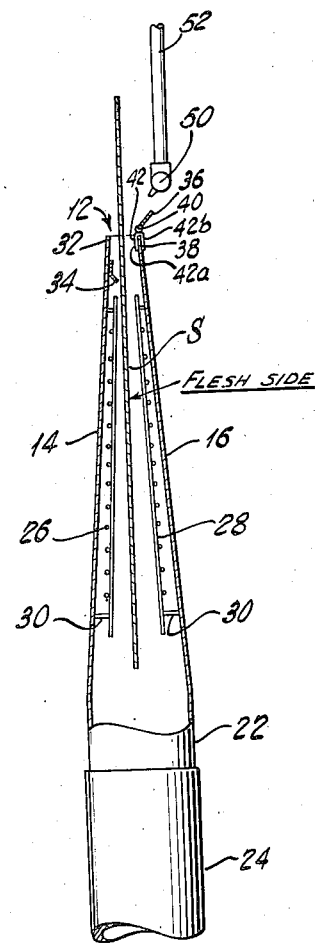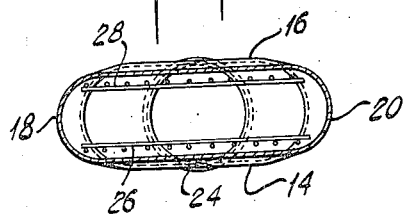

2,466,477

UNITED STATES PATENT OFFICE 2,466,477

METHOD AND APPARATUS FOR CLEANING SKINS AND THE LIKE

Alonzo B. Rhodes, Johnstown, N. Y.

Application November 6, 1947, Serial No. 784,468

14 Claims. (Cl. 69—1)

This invention relates to a device for cleaning skins and the like.

In converting a skin into finished leather there are a number of operations which leave dust and dye residue on the skin. Brushing of the skin is only partially successful in cleaning it, and is ineffective to remove the fine particles which cling to the skin due to the presence of static electricity. Heretofore some types of leather such as suede have been washed, but this is time consuming and expensive.

An object of the invention is to provide a simple, practical and efficient device for speedily removing shavings, dust and foreign matter from the skins.

Another object of the invention is to provide an improved method for efficiently separating and removing shavings, dust and foreign matter from skins.

Another object of the invention is to provide improved apparatus whereby foreign matter is shaken and beaten out of the skins.

Another object of the invention is to provide method and means for cleaning skins and the like with a saving in time and expense and with increased efficiency.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a front elevation of an embodiment of the invention;

Figure 2 is a side elevation taken on the line 2—2 of Figure 1; and

Figure 3 is a top plan view (with the steam pipe removed).

In the embodiment of the invention illustrated in the drawings the numeral 10 identifies a housing which at one end is long and narrow, and is characterized by having a long narrow mouth 12 through which a skin may be lowered into the housing and suspended therein, preferably with the flesh side to the rear. From the mouth 12, the side walls 14 and 16 diverge slightly and the end walls 18 and 20 converge to a neck 22 which is connected to a conduit 24. Conduit 24 is a suction conduit, and means (not shown) are provided, for evacuating conduit 24 and creating a strong flow of air into the housing through the elongated mouth 12.

The opposite sides 14 and 16 of the housing 10 are shown diverging slightly from the mouth 12 to conduit 16 but they are spaced only a short distance apart from top to bottom and are not far removed from parallelism. Inside the housing grid members 26 and 28 are provided attached to the walls 14 and 16 respectively and spaced therefrom a short distance, as by the spacing and attachment brackets 30. Projecting inwardly from the wall 14 a short distance from its extremity 32, which forms one lip of mouth 12, is a baffle 34 inclined inwardly. Another and oppositely inclined baffle member 36 is provided at the extremity 38 of side 16, which forms the other lip of the mouth 12. Baffle 36 may be an integral part of wall 16, bent outwardly to direct air into the mouth 12, but preferably baffle 36 is rotatably mounted on a pivot 40 supported at the closed end of a U-shaped clip member 42 which may be removably slipped over and positioned on the lip 38 with its arms 42$^a$ and 42$^b$ extending over and engaging opposite faces of side wall 16.

Positioned a few (preferably three or four) inches above and slightly to the rear of the mouth 12 of the housing and baffle 36, a perforated steam pipe 50 is provided, to which steam may be supplied through conduit 52, and which is adapted to inject steam toward and into the stream of air flowing rapidly into mouth 12 and between the hands of an operator holding a margin of a skin which is suspended in the housing, and the mouth 12. The air entering the housing entrains the stream, and, particularly the portion striking against the flesh side of the skin, is thus highly humidified, and I have found, serves to eliminate static electricity and thus facilitates the removal of fine particles of dust which otherwise cling tenaciously particularly to the flesh side of a skin.

While the apparatus described herein may be variously positioned, and, because of the strength of the air current drawn into the housing through mouth 12, may be operated in any position including a vertical position in which the mouth 12 is at the lower end of the housing, or in a horizontal position, a vertical position is preferred in which the mouth 12 is at the top of the housing with the perforated steam line 50 disposed substantially parallel with mouth 12 and adjacent thereto but somewhat offset as has been described, so that the steam will be directed particularly toward the flesh side of the skin, and so that an operator will have unobstructed access to the mouth 12 of the housing, and while holding one edge of a skin S can lower the skin into the housing through mouth 12 and can hold it so that substantially all of the skin is suspended within the housing.

It will be seen that when the skin is thus suspended in the housing through mouth 12 air will be drawn into the housing on either side of the skin, and the air flow which is deflected inwardly by baffle 36 will strike the skin along a line which is above the line of impact of air entering the housing on the opposite side of the skin and which is deflected against the skin by the baffle 34.

I have found that directing currents of air against the skin while it is suspended in the housing, along lines at different distances from the mouth 12, sets up a steady, rhythmic wave motion in the skin, and the sides 14 and 16, and the baffles 34 and 36, are spaced apart respectively by distances such that the amplitude of the wave is sufficient relative to the distance between the grids to cause opposite faces of the skin to successively strike violently against the grid members 26 and 28 as the wave motion runs down the length of the skin. The free end of the skin is able to move back and forth a greater distance than the end of the skin held by the operator and the slightly diverging relation of the side walls 14 and 16, and of the grids 26 and 28, makes allowance for this with the result that the skin throughout its length beats against the grids 26 and 28, the foreign matter which is separated from the skins by this action being thrown through the grids against the inner surfaces of the side walls 14 and 16 and removed with the air current flowing through the housing into conduit 24.

I have obtained very satisfactory results using apparatus of the kind described above. The rhythmic beating of the skin against the grids effectively removes the dust, shavings and other foreign matter from the skins, and only a fraction of a minute is ordinarily required for the treatment of each skin. The device is so simple and sure in operation that no particular skill is required on the part of the operator.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. The method of cleaning skins which comprises suspending a skin in a housing, drawing air into the housing on either side of the skin, and directing the incoming air so that separate streams of air strike against the skin on opposite sides thereof and at different distances from a margin of the skin.

2. The method of cleaning skins which comprises drawing air through a housing, suspending a skin so that the greater part thereof extends into the housing, and directing the air flow within the housing so that air is deflected against opposite sides of the skin at different distances from the outer margin of the skin.

3. The method of cleaning skins which comprises, setting up a wave motion in the skin while suspending the skin between two walls spaced apart a distance less than the amplitude of the wave, and withdrawing the dust and other foreign matter separated from the skin by the resultant beating of the skin against the said walls.

4. Apparatus for cleaning skins which comprises a relatively long narrow housing having at one end a long narrow mouth, a suction conduit means connected to the other end of the housing for drawing air into said mouth and through said housing, said housing comprising two walls defining at one extremity the lips of said mouth and diverging somewhat from said lip forming extremities toward said conduit, and a plurality of baffle means, extending from said walls respectively in staggered relation and adapted to cause incoming air to be deflected forcibly upon opposite sides of, and at different distances from, the leading edge of a skin suspended within the housing through said mouth.

5. Apparatus for cleaning skins which comprises a relatively long narrow housing having at one end a long narrow mouth, means for drawing air into the housing and creating a flow of air through said housing, said housing comprising two opposed walls defining a long, narrow air channel, and baffle means extending from said walls respectively at different distances from the entrance end of the housing and adapted to cause incoming air to be deflected forcibly upon opposite sides, and at different distances from the leading edge, of a skin suspended within the housing through said mouth thus setting up a wave in the said skin, said channel defining walls being separated by a distance less than the amplitude of the wave motion set up in said skin.

6. Apparatus as claimed in claim 4 wherein one of said baffles is an outward extension of one of the lips defining the mouth of said housing.

7. The apparatus as claimed in claim 4 wherein the angle of the outer of said baffle means is adjustable relative to the housing side wall with which it is related to provide variable control of the volume of air directed into the housing.

8. The apparatus as claimed in claim 4 in which a steam line is provided adjacent to the mouth of said housing and adapted to inject steam into the air flowing into said housing.

9. Apparatus as claimed in claim 5 wherein the walls against which the said skin beats when wave motion is set up therein comprises grid-like members spaced from, but attached to the inner faces of said housing walls respectively.

10. The method of cleaning skins and the like which comprises suspending a skin in a relatively long narrow channel, drawing air through said channel on opposite sides of said skin, humidifying the air entering said channel and particularly the portion thereof which flows over the flesh side of the skin, and directing the air so that it strikes on opposite sides of the skin at different distances along the length of the skin.

11. The method of treating skins to clean them which comprises suspending a skin and directing an air flow against opposite sides of the skin along lines which are in staggered relation and at different distances from a given margin of the skin, thus setting up a wave in the skin causing different portions of the skin to move in opposite directions a distance dependent upon the amplitude of the wave, providing contact surfaces spaced on opposite sides of said skin respectively a distance less than one half of the amplitude of the said wave, and humidifying at least the air flow which is directed against one portion of the skin surface.

12. The apparatus as claimed in claim 5 wherein means are provided for humidifying the air flowing into said housing and particularly the portion thereof which comes in contact with the flesh side of the skin suspended therein.

13. Apparatus for cleaning skins which comprises a housing having at one end a long narrow mouth, means for drawing air into the housing and causing a flow of air through the housing, a first baffle inclined outwardly from said housing along one side of said mouth, another baffle inclined inwardly from the side of the housing opposite to said first baffle, and spaced from the mouth, and contact members positioned inwardly of the housing from said baffle means positioned so as to be contacted by a skin suspended within the housing through said mouth when a wave is set up in the skin.

14. Apparatus as claimed in claim 4 in which one of said baffle means projects outwardly from one of said walls and the other baffle means projects inwardly from the other of said walls.

ALONZO B. RHODES.

No references cited.